Feb. 22, 1966  SHOHEI YASUKAWA ETAL  3,236,032
VACUUM CLEANER WITH FILTER CLEANING MEANS
Filed Jan. 15, 1963

INVENTORS
S. YASUKAWA
S. HAYASHI
K. TAKAHASHI
M. FUJIHARA
S. OYA

BY: Paul M. Craig, Jr.
ATTORNEY

Feb. 22, 1966  SHOHEI YASUKAWA ETAL  3,236,032
VACUUM CLEANER WITH FILTER CLEANING MEANS
Filed Jan. 15, 1963  6 Sheets-Sheet 2

INVENTORS
S. YASUKAWA
S. HAYASHI
K. TAKAHASHI
M. FUJIHARA
S. OYA

BY: Paul M. Craig, Jr.
ATTORNEY

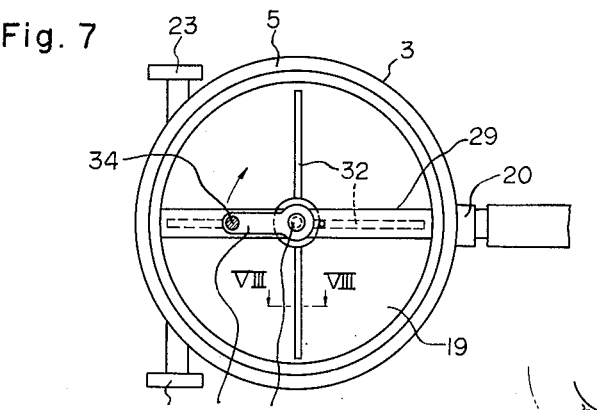
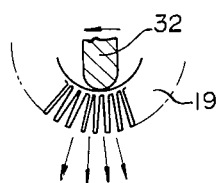
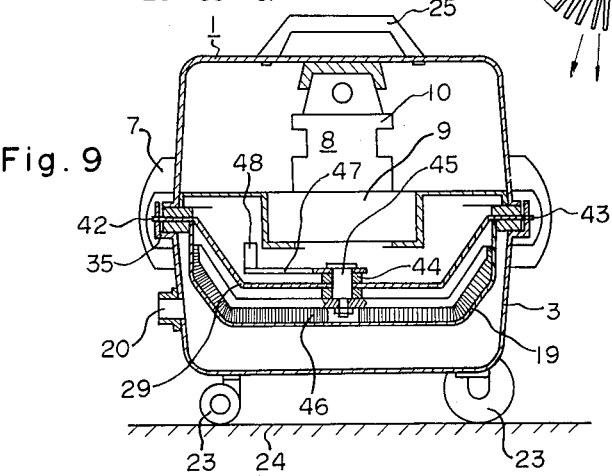
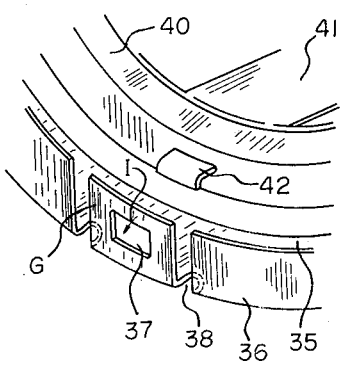

INVENTORS
S. YASUKAWA
S. HAYASHI
K. TAKAHASHI
M. FUJIHARA
S. OYA

BY: Paul M. Craig, Jr
ATTORNEY

United States Patent Office 3,236,032
Patented Feb. 22, 1966

3,236,032
VACUUM CLEANER WITH FILTER CLEANING MEANS
Shohei Yasukawa, Mito-shi, and Seiichi Hayashi, Kimio Takahashi, Masahiko Fujihara, and Saburo Oya, Hitachi-shi, Japan, assignors to Hitachi Ltd., Tokyo, Japan, a corporation of Japan
Filed Jan. 15, 1963, Ser. No. 251,601
Claims priority, application Japan, Jan. 22, 1962, 37/1,493
11 Claims. (Cl. 55—299)

The present invention relates to electrically operated vacuum cleaners and is intended to simplify or facilitate the removal of dust and dirt particles sticking to the fabric filter.

Conventionally, the dust sticking to the fabric filter surface has been removed therefrom, for example, by brushing the fabric surface, by lightly heating the fabric with a rod or the like, or by swinging the filter bag to hit something. This manner of dust removal from the cloth bag is not only troublesome requiring the application of external force against the dust-carrying surface of the bag, but is also unsanitary resulting in soiling of the operator's hands and a general raising of dust in the area where the cleaning operation is performed.

In view of these deficiencies, the present invention has for its object to provide a simple and sanitary dust-removing device for an electric vacuum cleaner. To this end, according to the present invention, a presser device is provided to engage the surface of the filter cloth opposite to the dust-carrying surface thereof for progressively deforming the cloth over the entire area thereof in a manner so as to tighten the texture of the cloth along the outside surface of the bag having no dust sticking thereto while loosening the texture along the dust-carrying surface of the cloth thereby to release the dust and dirt particles therefrom.

The foregoing and other objects, features and advantages of the present invention will become apparent from the following description when taken in conjunction with the accompanying drawings, which illustrate various embodiments of the invention and in which like references have been used to designate like parts in several figures wherever possible.

In the drawings:

FIG. 7 is a plan view of the embodiment illustrated in FIG 6 with its upper casing section removed;

FIG. 8 is a cross-sectional view taken along the line VIII—VIII in FIG. 7;

FIG. 9 is a view similar to FIGS. 3 and 6 illustrating a further embodiment of the invention;

FIGS. 10 and 11 are enlarged fragmentary perspective views of the respective parts in FIG. 9 encircled by the dot-dash lines, illustrating the mounting of the dust-removing device;

Figure 1:
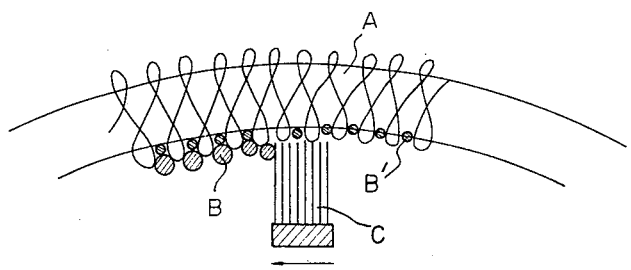
FIGS. 1 and 2 are explanatory diagrams showing the basic principle of dust removal on the conventional vacuum cleaner and on the cleaner according to the present invention, respectively.

Referring first to FIG. 1, which diagrammatically illustrates the conventional method of removing the dust from the filter cloth, a brush C is employed to remove the dust particles B from the cloth surface A on which they have remained attached. It may appear that the dust particles B are swept off by the brushing operation but in fact a substantial quantity of the dust particles is pushed by the brush into the structure of the cloth to close or clog its texture thus impairing the performance of the filter cloth A. In addition, this technique provides the disadvantage that finer dust particles B' during the brushing operation are forced into the filter cloth and penetrate to the opposite surface thereof, where they remain attached. Moreover, the conventional method obviously involves a sanitary problem in that the dust is stirred up as the brush C acts to dislodge and carry the dust particles along the cloth surface.

Figure 2:
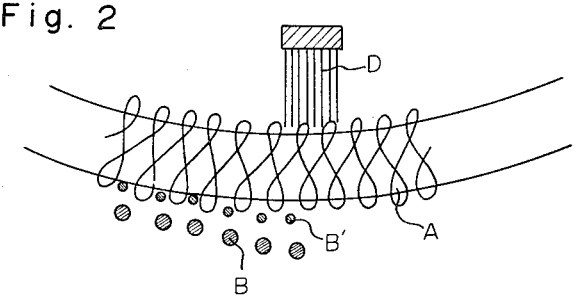

In overcoming the foregoing deficiencies, according to the present invention, the principle of which is illustrated in FIG. 2, a presser device D is employed to engage the outside surface of the filter cloth A opposite to the dust-carrying surface thereof for progressively deforming the cloth fibers over the entire surface area thereof. The presser D thus acts to expand or loosen the texture of the cloth A along its dust-carrying surface allowing the dust particles B previously caught by the texture to be released to fall off freely. At the same time, the presser D acts to contract or tighten the texture of the cloh along its dust-free surface, and thus effectively precludes penetration of any dust particles including the finer particles B' through the cloth texture to the opposite surface, which is engaged by the presser D. It will be appreciated that the sanitary problem with conventional cleaners particularly of stirring up dust has thus been effectively solved and the dust removal from the filter cloth can be carried out in a highly sanitary manner.

Figure 3:
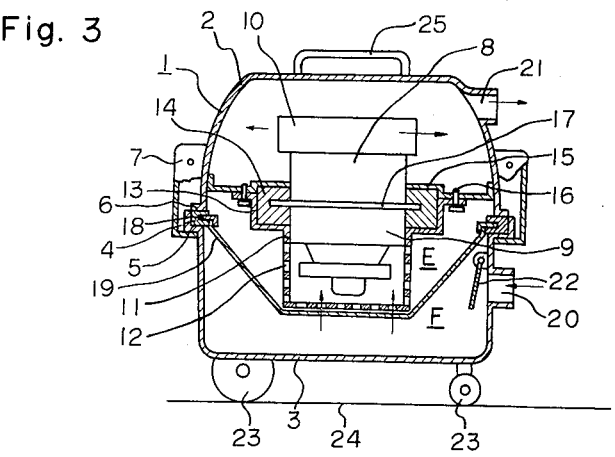
FIG. 3 is a vertical cross-sectional view of an electric vacuum cleaner embodying the invention.
Figure 4:
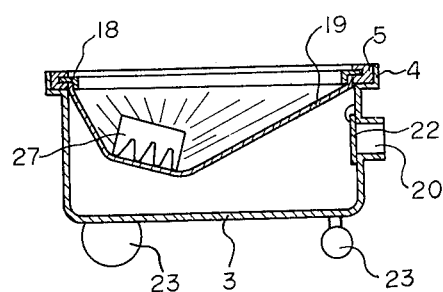
FIGS. 4 and 5 illustrate the manner in which dust removal is effected according to the present invention.
Figure 5:
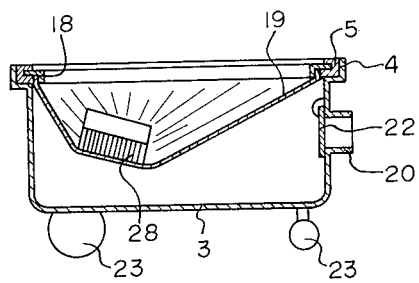

Referring next to FIGS. 3 to 5, the cleaner embodying the invention includes a casing 1 divided into a top and a bottom section 2 and 3, respectively. The bottom casing section 3 carries at the top an annular support 4 in the form of a flange including a horizontal portion extending radially outwardly from the top of the bottom casing and a vertical portion extending from the outer periphery of the horizontal portion. An annular packing 5 formed, for example, of rubber or like material is fitted in the annular support 4. The top casing 2 is formed at the bottom with a radially outwardly extending annular flange 6 and is placed on the bottom casing 3 with the flange 6 abutting against the annular packing 5. The top and bottom casing sections 2 and 3 are detachably secured to each other by clamping means 7 so as to seal the interior of the casing 1 from the exterior.

A fan assembly 8 is mounted on the casing 1 and of the conventional structure, including an electric drive motor 9 at the bottom and a fan 10 at the top. The motor 9 is enclosed by a generally cup-shaped cover 11, the lower portion of which is formed with a multiplicity of vent holes 12. The cover 11 is shouldered at the top as indicated at 13 to form an annular cavity for receiving an annular antivibration rubber element 14. The top portion of the cover 11 defining the cavity has a flange 14 radially outwardly extending from its top and secured by screw means 16 to a partition 15 secured to the inner wall of the top casing section 2 as by welding. The partition 15 extends radially inwardly to the peripheral wall of the fan assembly 8 and overlies the top surface of the rubber element 14, as illustrated.

The fan assembly 8 also includes an annular flange 17 intermediate its ends and embedded in the rubber element 14 so that the entire fan assembly is secured firmly to the top casing section 2 in antivibratory fashion.

An air filter 19 formed of a flexible cloth is secured to said annular packing 5 through the intermediary of a fixing frame 18. As illustrated, the filter cloth 19 is tensioned downward by the bottom of the motor cover 11, forming opposite sides including the inside F where dust remains attached and the outside E opposite thereto. In operation, the electric motor 9 drives the fan 10 so that the dust-laden air is drawn in through a suction port 20 formed in the lower casing 3 and filtered by the fabric filter 19 to separate the dust off. The filtered air passes through the fan assembly 8 and is finally exhausted through an exhaust port 21 formed in the top casing 2. A valve 22 provided at the suction port 20 is adapted to be forced to open by the flow of dust-laden air created by the atmospheric pressure.

Though for simplicity's sake no cleaner hose nor suction nozzle is shown in the drawings, it is to be understood that they are connected to the suction port 20 and the cleaner body 1, freely movable over the floor 24 owing to the provision of wheels 23 on the bottom of the lower casing section 3 simply by pulling the hose connected thereto. The cleaner body may also be carried by hand by way of a handle 25 secured to the top casing section 22.

When after use of the cleaner it is desired to remove dust remaining attached to the fabric filter 19, it is required first to release the clamp 7 and then to remove the upper casing section 2. At this time, if the motor 9 and fan 10 are still coasting, slight vacuum is maintained between the fan 10 and the fabric filter 19. This may cause the filter cloth 19 to be sucked up together with the top casing section 2 being removed until the motor 9 comes to rest at which time the filter cloth 19 is released from the top casing to fall under gravity possibly allowing the dust particles sticking to the cloth to be scattered about. To eliminate such difficulty, the annular packing 5 is preferably formed about its periphery with a plurality of projections 26, which are held in frictional engagement with the inner peripheral wall of the annular shoulder 4 on the lower casing section 3. It will readily be understood that with such arrangement there is no danger that the fabric filter 19 be sucked up when the upper casing section 2 is removed upward while the motor 9 and fan 10 are still coasting.

To remove the dust from the filter cloth 19, a presser 27 having a rake-like formation (FIG. 4) or a brush (FIG. 5) is employed to sweep the outer or upper surface of the filter cloth progressively over the entire area thereof with the fabric filter kept secured to the lower casing section 3 whereby the dust particles are dislodged to fall to the bottom of the lower casing section 3. It is to be understood that at this time the suction port 20 is already closed by the valve 22 and the dust particles cannot escape out through the suction port 20. The dust thus collecting in the casing bottom can be disposed of in quite a sanitary fashion. Namely, it can be carried away without the danger of the dust being stirred up if only the fabric filter 19 is detached from the lower casing section 3. It is to be understood that the presser 27 may take any desired form as long as it serves adequately to the purpose.

Figure 6:
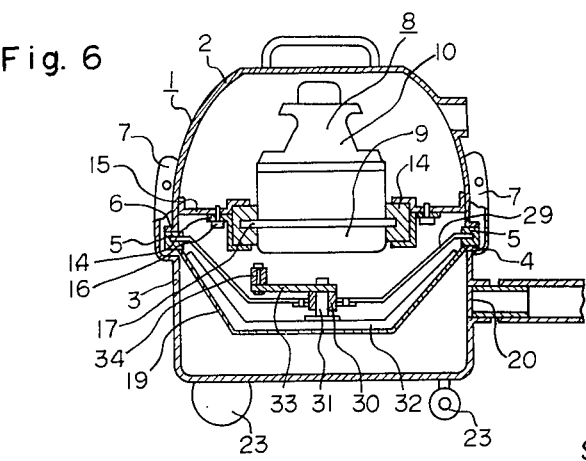
FIG. 6 is a view similar to FIG. 3 showing another embodiment of the invention.
Figure 20:
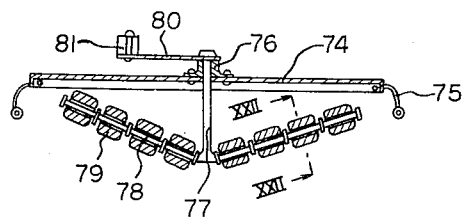
FIG. 20 is a vertical cross-sectional view of a further form of dust-removing device according to the invention.
Figure 21:
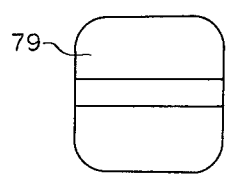
FIG. 21 is a front view of one of the ridged rotors shown in FIG. 20.
Figure 22:
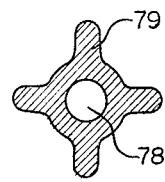
FIG. 22 is a transverse cross-section of the rotor shown in FIG. 21.
Figure 23:
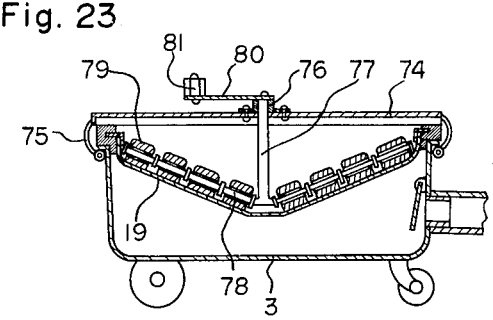
FIG. 23 is an explanatory diagram showing the device of FIGS. 21 and 22 set for dust removing operation.

In FIGS. 6 to 8, illustrating another embodiment of the present invention, the annular packing 5 to which the fabric filter 19 is secured carries a support frame 29 having at the center a bearing formation 30 in which a stub shaft 31 is rotatably journaled. Secured to the stub shaft 31 at its bottom is a radial array of slide arms 32 for sliding engagement with the entire external or top surface of the fabric filter 19. A handle 33 is secured to the top of the shaft 31 and includes a hand grip 34. When the handle 33 is rotated to rotate the slide arms 32 while being held in engagement with the upper surface of the filter cloth 19, the texture of the cloth is expanded or made looser along its bottom or dust-carrying surface so as to allow any dust particles to be readily dislodged. The cloth-engaging surface of each of the slide arms 32 may be made smooth or indented, as will readily be understood. Also, each of the slide arms 32 may carry a number of ridged rollers, as will be described hereinafter with reference to FIG. 20.

Figure 11:
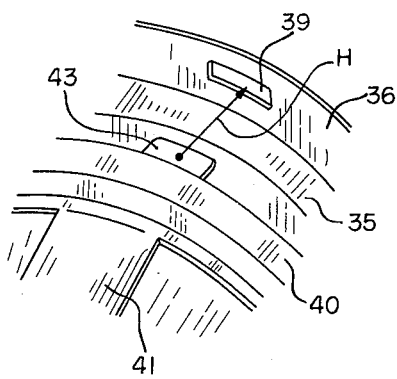

FIGS. 9 to 15 illustrate a further embodiment of the present invention. Reference will first be made to FIGS. 9 to 11. The lower casing section 3 is formed at the top with an annular support 35 including an upturned peripheral wall 36, a portion G of which is formed with a rectangular aperture 37 with a pair of U-shaped slots 38 formed on opposite sides of the aperture in slightly spaced apart relation thereto so as to make the wall portion G resilient. The peripheral wall 36 is also formed with a similar rectangular aperture 39 in diametrally opposite relation to the aperture 37. An annular packing 40 is fitted to the annular support 35 with a fabric filter 19 and a support bar 41 secured to said annular packing 40. The support bar 41 extends at opposite ends beyond the periphery of the annular packing 40 to form lugs 42 and 43. One of the lugs 42 extends through the adjacent rectangular aperture 37 and has its end downturned. The other lug 43 extends through the adjacent rectangular aperture 39. The support bar 41 has a bearing portion 44 intermediate its end with a stub shaft 45 rotatably fitted in said bearing portion 44. A brush 46 is secured to the bottom of the shaft 45 for sliding engagement with the entire external or upper surface of the filter cloth 19. A handle 47 is secured to the top of the shaft 45 and includes a hand grip 48. When the handle is operated by way of the grip 48, the brush 46 sweeps over the external surface of the filter cloth 19 to expand the texture of the cloth along the inner or dust-carrying surface thereof to allow the dust particles to be readily dislodged. On this occasion, it is noted that the entire filter assembly is held in a state very favorable to the rotary motion of the brush 46 but will not be dislocated on the lower casing section 3 since the lugs 42 and 43 provided on the opposite ends of the assembly are secured in the respective rectangular apertures 37 and 39 in the lower casing section 3. When it is desired to remove the filter assembly from the lower casing section 3, it is only required first to manually displace the top end of the wall portion G formed with the rectangular aperture 37 outwardly out of its engagement with the adjacent lug 42 and then to raise the entire assembly while holding it in slightly inclined position. To replace the filter assembly onto the lower casing section, a suitable portion of the assembly, in this case, the lug 43 on the support bar 41 thereof is first inserted into the rectangular aperture 39 in the lower casing section 3 as indicated by the arrow H and then the entire assembly is bodily forced down against the lower casing so that the extremity of the opposite lug 42 displacing the portion G formed with the rectangular aperture 37 as indicated by the arrow I comes into engagement with the lug 42. It is noted that the removal and replacement of the filter assembly is readily possible due to the resilience of said wall portion G, which after the assembly has been replaced is restored to its normal position effective to secure engagement of the lugs 42 and 43 with the respective apertures.

Figure 12:
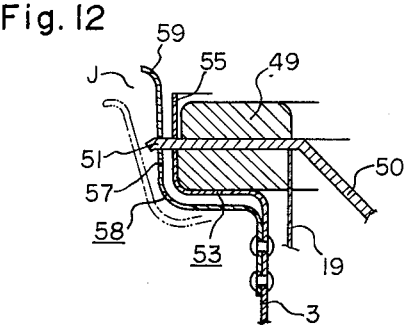
FIGS. 12 and 13 illustrate a modified mounting of the dust-removing device in vertical cross section.
Figure 13:
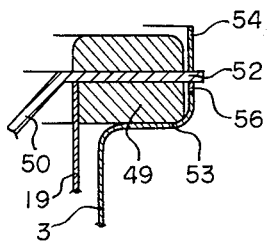
Figure 14:
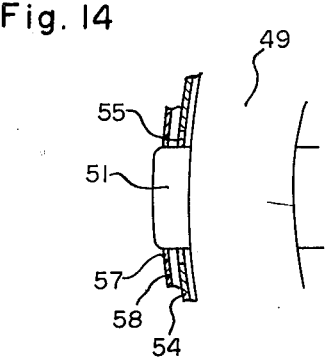
FIGS. 14 and 15 illustrate the same in plan.
Figure 15:
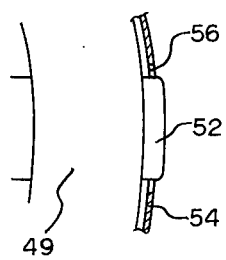

Description will now be made with reference to FIGS. 12 to 15, which illustrate a modified form of device for detachable engagement of the filter assembly with the lower casing section 3. Secured to the annular packing 49 are a support bar 50 and a filter cloth 19. The opposite ends of the support bar 50 extend outwardly beyond the periphery of the annular packing 49 to form respective lugs 51 and 52. One of the lugs 51 has a downturned extremity as shown in FIG. 12. The lower casing section 3 is formed at the top with an annular support 53 including a peripheral wall 54, which has a U-shaped slot 55 formed to receive one of said lugs 51 and a rectangular aperture 56 diametrically opposite to said slot 55. Fixedly arranged in front of said U-shaped slot 55 is a latching member 58 formed with a rectangular aperture 57 for engagement with the lug 51 and made of resilient material, for example, taking the form of a leaf spring, the top extremity 59 of which may assume the position indicated by the two-dot chain lines in FIG. 12 under an adequate external force and be restored to its normal position when such external force is removed, as indicated by the double arrow J.

In assembling the filter assembly onto the lower casing section 3, it is carried by its suitable part, in this case the support bar 50 so that one of the lugs 52 thereon is inserted into the rectangular aperture 56. The entire assembly is then pushed down so that the opposite lug 51 is lowered while forcing the top portion 59 of the latching member 58 outwardly to engage the rectangular aperture 57 formed therein. Once the lug 51 has been placed in engagement with the latching member, the latter is readily restored to its normal position due to its resiliency to maintain the engagement of the lugs 51 and 52 with the respective apertures 57 and 56. This arrangement is very favorable to the rotary motion of the brush 46 since, as described above, the filter assembly as a whole is held securely attached to the lower casing section 3 with the opposite lugs 52 and 51 held in engagement with the rectangular apertures formed in the lower casing 3 and the latching member 58 secured thereto, respectively.

When it is desired to remove the filter assembly, the top extremity 59 of the latching member 58 is first forced outwardly by the fingertip to release the associated lug 51 and then the entire assembly is raised while being held in slightly inclined position to clear the lug of the member 58. It is noted that the filter assembly can thus be attached to and detached from the lower casing section 3 by an extremely simple operation.

Figure 16:
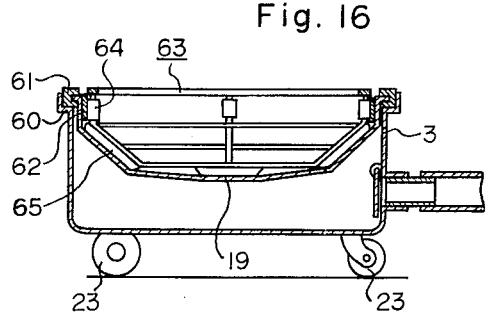
FIG. 16 illustrates yet another embodiment of the present invention with its top casing section removed.
Figure 17:
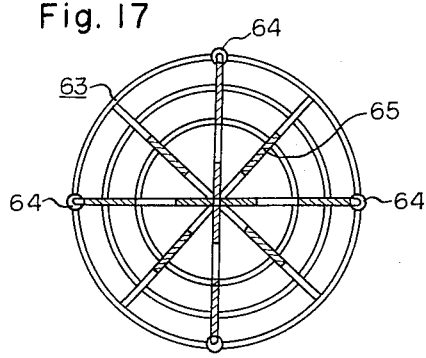
FIG. 17 is a bottom plan view of the rotary member shown in FIG. 16.

Referring to FIGS. 16 and 17, which illustrate a further embodiment of the present invention, the lower casing section 3 has an annular support 60 in which an annular packing 61 is fitted. A fabric filter 19 and a mounting frame 62 therefor are secured to the annular packing 61. Placed on said fabric filter is a rotary member 63 in the form of a cup-shaped framework. A number of rollers 64 are vertically mounted on the rotary member 63 in contacting engagement with the inside of the annular mounting frame 62. Also, a number of brushes 65 are mounted on the bottom of the rotary member 63 in a manner so that, when the rotary member 63 is manually rotated, the brushes 65 sweep over the entire external surface of the filter cloth 19 to remove the dust therefrom in the manner as described hereinbefore.

Figure 18:
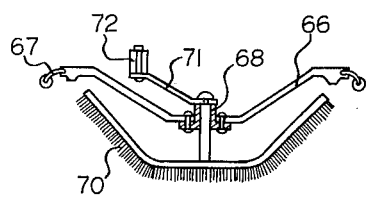
FIG. 18 is a front view of another form of dust-removing device embodying the invention.
Figure 19:
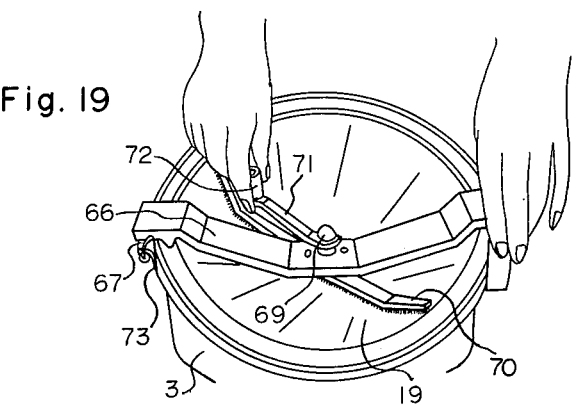
FIG. 19 is a perspective view showing the manner in which the device shown in FIG. 18 is operated.

Yet another embodiment of the present invention illustrated in FIGS. 18 and 19 includes a support bar 66 formed at opposite ends with engaging portions 67. A rotary shaft 69 is journaled in a bearing portion 68 formed on the support bar 66 intermediate its ends. A generally V-shaped brush 70 is secured to the bottom end of the rotary shaft 69 with a handle 71 secured to the top thereof and carrying a hand grip 72 for rotating the brush 70. After the cleaning operation, when it is desired to dislodge dust particles from the filter cloth 19, one of the engaging portions 67 of the support bar 66 is placed in engagement with a clamp means 73 provided on the lower casing section 3 to hold the brush 70 in sliding contact with the external surface of the filter cloth 19 and the handle 71 is rotated to dislodge the dust particles off the filter cloth to the bottom of the lower casing section 3.

FIGS. 20 to 23 illustrate a further form of dust-removing device according to the present invention, which includes a support bar 74 carrying at opposite ends detents or engaging portions 75 and intermediate its ends a bearing portion 76 in which a rotary shaft 77 is journaled. Secured to the bottom end of the rotary shaft 77 is a generally V-shaped rod 78 on which a plurality of winged rollers 79 are rotatably mounted with a handle 80 secured to the top of the shaft 77 and carrying a hand grip 81 for manual rotation of the rod 78. After the use of the cleaner, when it is desired to remove dust and dirt particles from the filter cloth 19, the support bar 74 is secured to the lower casing section by engagement of the detents 75 on the bar with the clamp means 73 on the lower casing section 3 so that the winged rollers 79 are placed in rotative contact with the external surface of the filter cloth. Then, the handle 80 is rotated to cause the dust particles to be dislodged and fall down to the bottom of the lower casing section 3 in the same manner as described in connection with the preceding embodiments.

It will be appreciated from the foregoing that, according to the present invention, since the dust is removed from the fabric filter simply by rubbing or sweeping the back surface thereof, the dust-carrying surface of the filter cloth cannot be damaged in any way and thus the cloth has a characteristically extended service life.

Having described a number of embodiments of the invention, it is not to be limited to the details set forth but it is to be accorded the full scope of the appended claims.

What is claimed is:

1. An electric vacuum cleaner comprising a top casing having a fan assembly, an exhaust port, and an annular flange, a bottom casing having a suction port and annular support, an annular packing held between said annular flange and said annular support, a flexible filter cloth supported on said annular packing as a partition between said top and bottom casings and having an upper side and a lower side facing said top and bottom casings, respectively, a support frame disposed between said fan assembly and said filter cloth, a handle means mounted on said support frame, and a sliding member rotatably carried by said handle in sliding engagement with said upper surface of said filter cloth to progressively deform the filter cloth over the entire area thereof.

2. An electric vacuum cleaner according to claim 1 in which said sliding member is composed of brushes.

3. An electric vacuum cleaner according to claim 1 in which said sliding member is composed of winged rollers.

4. An electric vacuum cleaner comprising a casing divided into an upper section formed with an exhaust port and a lower section formed with a suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly.

5. An electric vacuum cleaner comprising a casing divided into an upper section formed with an exhaust port and a lower section formed with a suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said rotary member being provided as a plurality of radially extending arms rotatable about an axis concentric with said casing.

6. An electric vacuum cleaner comprising a casing divided into an upper section formed with an exhaust port and a lower section formed with a suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said rotary member being provided as a plurality of radially extending arms rotatable about an axis concentric with said casing, and a plurality of winged rollers rotatably mounted on said arms in contact with said filter cloth.

7. An electric vacuum cleaner comprising a casing divided into an upper section formed with an exhaust port and a lower section formed with suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said lower casing section being formed with an annular support, an annular packing fitted in said annular support to secure said fabric filter assembly, said annular support including a peripheral wall formed with a pair of rectangular apertures in diametrically opposite relation to each other and a pair of slots on opposite sides of one of said rectangular apertures, and a support bar having lugs extending outwardly through said annular packing at opposite ends thereof to engage with respective rectangular apertures.

8. An electric vacuum cleaner comprising a casing divided into an upper section formed with an exhaust port and a lower section formed with a suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said rotary member being provided as a plurality of radially extending arms rotatable about an axis concentric with said casing, and a plurality of brushes mounted on said arms in contact with said filter cloth.

9. An electric vacuum cleaner comprising a casing divided into an upper section formed with an exhaust port and a lower section formed with an suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said presser means further including a removable support frame positioned diametrically within said lower casing section between said fan assembly and said filter cloth, said means for rotating said presser means being mounted upon said support frame at substantially the center thereof and being in the form of a rotary shaft journaled in said support frame and secured to said rotary member and a handle for effecting manual rotation of said shaft.

10. An electric vacuum cleaner comprising a casing divided into an upper section formed with an exhaust port and a lower section formed with a suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said rotary member being provided as a plurality of radially extending arms rotatable about an axis concentric with said casing, said presser means further including a removable support frame positioned diametrically within said lower casing section between said fan assembly and said filter cloth, said means for rotating said presser means being mounted upon said support frame at substantially the center thereof and being in the form of a rotary shaft journaled in said support frame and secured to said rotary member and a handle for effecting manual rotation of said shaft.

11. An electric vacuum cleaner comprising a casing divided into an upper section formed with an exhaust port and a lower section formed with a suction port, a fan assembly secured to the upper casing section and a fabric filter assembly including a filter cloth interposed between said upper and lower casing sections so as to form a partition therebetween, presser means including a rotary member supported adjacent to said fabric filter assembly in sliding engagement with the surface of said filter cloth facing said upper casing section to progressively deform the filter structure over the entire area thereof and means for rotating said presser means with respect to said fabric filter assembly, said lower casing section being provided with an annular support and an annular packing positioned on said annular support and secured to said filter cloth, said annular support including a peripheral wall formed with a rectangular aperture and a slot diametrically opposite to said rectangular aperture, a support bar having lugs extending outwardly through said annular packing at opposite ends thereof to engage said rectangular aperture and extend through said slot, and a latching member in the form of a resilient plate secured to the outside of the lower casing section and formed with a rectangular aperture in alignment with said slot to engage the extremity of that lug which extends through said slot.

References Cited by the Examiner

UNITED STATES PATENTS

| | | | |
|---|---|---|---|
| Re. 11,528 | 3/1896 | Livergood | 55—296 |
| 517,471 | 4/1894 | Martin | 55—246 |
| 573,837 | 12/1896 | Whitmore | 55—299 |
| 2,495,635 | 1/1950 | Hersey | 55—294 |
| 2,534,171 | 12/1950 | Kirby | 55—299 |
| 2,725,953 | 12/1955 | Dow | 55—304 |

FOREIGN PATENTS

| | | |
|---|---|---|
| 115,330 | 11/1900 | Germany. |
| 622,412 | 11/1935 | Germany. |
| 742,458 | 10/1944 | Germany. |

HARRY B. THORNTON, *Primary Examiner.*